(No Model.)   2 Sheets—Sheet 1.
P. D. DUPONT.
FORK PRONG ROLLING MACHINE.
No. 315,396.   Patented Apr. 7, 1885.
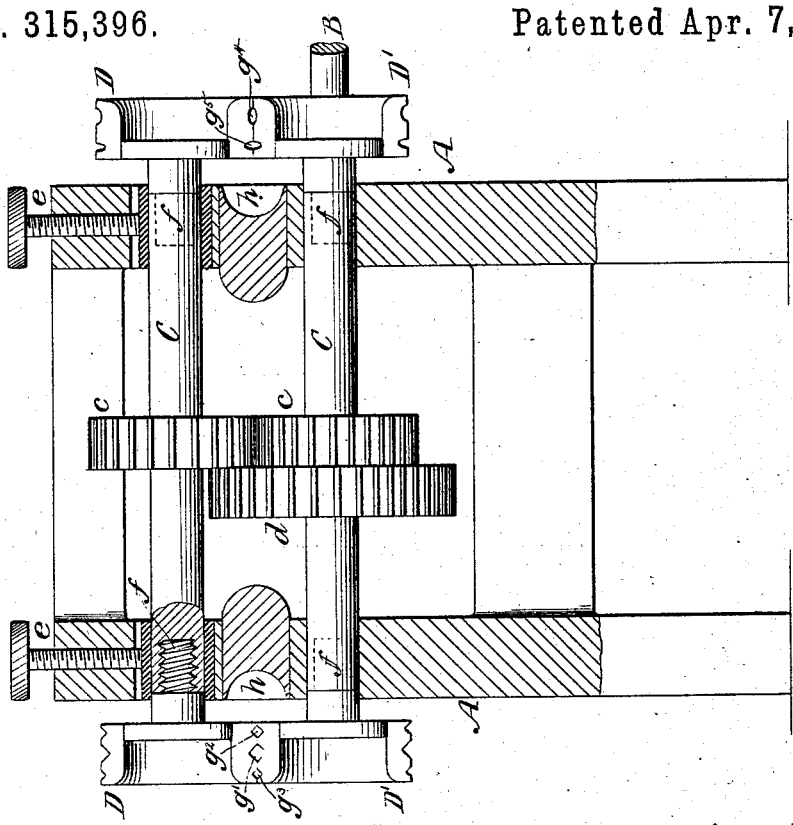
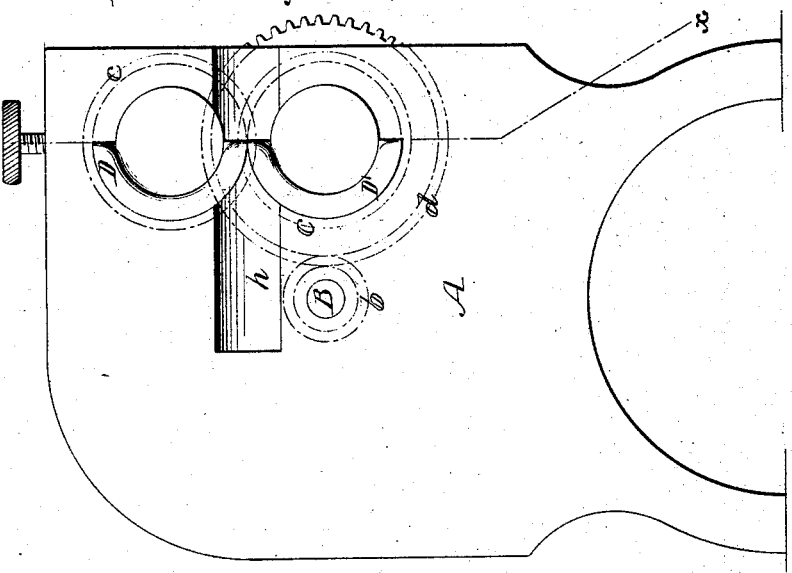
WITNESSES:
John K. Deemer
C. Sedgwick
INVENTOR:
P. D. Dupont
BY Munn & Co.
ATTORNEYS.

(No Model.) 2 Sheets—Sheet 2.
P. D. DUPONT.
FORK PRONG ROLLING MACHINE.
No. 315,396. Patented Apr. 7, 1885.
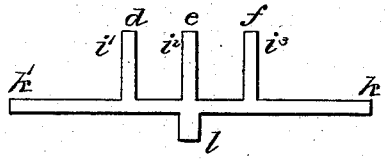
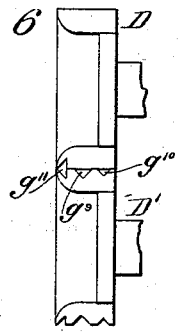
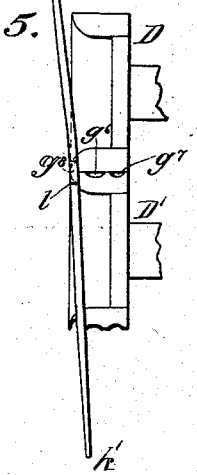
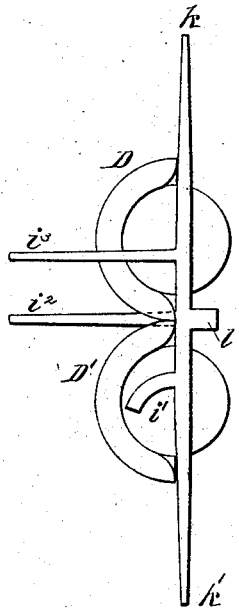
WITNESSES:
John H. Deemer
C. Sedgwick
INVENTOR:
P. D. Dupont
BY Munn & Co
ATTORNEYS.

UNITED STATES PATENT OFFICE.

PHILIPPE DÉNÉRY DUPONT, OF SUMMERVILLE, VERMONT.

FORK-PRONG-ROLLING MACHINE.

SPECIFICATION forming part of Letters Patent No. 315,396, dated April 7, 1885.

Application filed June 12, 1884. (No model.)

*To all whom it may concern:*

Be it known that I, PHILIPPE DÉNÉRY DUPONT, of Summerville, in the county of Caledonia and State of Vermont, have invented certain new and useful Improvements in Fork-Prong-Rolling Machines, of which the following is a full, clear, and exact description.

This invention relates to machines for rolling or drawing the prongs of agricultural forks, including prongs of oval shape in transverse section, half-round prongs, such as used in potato-diggers, and the triangular-shaped prongs of spade-forks.

The invention comprises a combination of specially and suitably grooved half-rolls and a frame, on the outside of which said rolls work, constructed with a recess or space for certain of the prongs while the other prongs are being rolled, substantially as hereinafter described.

The machine embodying the invention is applicable to the rolling of the prongs alike of many and few pronged forks, both the inside and outside prongs in forks which have more than two prongs, without having resort to the hammer, and the work is not only done more neatly and better or more evenly and smoothly, but very much more rapidly than with the hammer, and at a great saving of time, labor, and expense.

The machine may be made either single or double—that is, with only one pair of half-rolls on the one side of it, or with half-rolls on both or opposite sides of it.

Reference is to be had to the accompanying drawings, forming part of this specification, in which similar letters of reference indicate corresponding parts in all the figures.

Figure 1 represents a side view of a double machine embodying my invention, and Fig. 2 a vertical sectional view on the irregular line $x\,x$ in Fig. 1. Fig. 3 represents a longitudinal face view of a five-pronged fork-blank, by way of illustration, before its introduction to the machine. Fig. 4 an end view of a pair of half-rolls with a fork-blank in one of its positions for the rolling of its intermediate prongs, and Fig. 5 an elevation at right angles to Fig. 4 of said half-rolls with said fork-blank in position, as in Fig. 4. Fig. 6 is a view similar to Fig. 5 of the half-rolls, but with the grooves therein of a different shape.

A indicates the frame of the machine, the general construction of which may be of any suitable description.

B is a main or balance wheel driving-shaft extending across the frame and carrying a pinion, $b$. C C are the half-roll shafts, geared with each other by spur-wheels $c\,c$, and driven by the pinion $b$ in gear with a wheel, $d$, on one of said shafts C. These shafts C C, which also extend across the frame, have secured on their opposite ends overhanging half-rolls D D', of hollow construction, when the same are designed to roll many-pronged forks. One of these shafts C is adjustable up or down toward the other by means of sliding boxes and screws $e\,e$ to adjust the upper and lower half-rolls relatively to each other, as required. The half-rolls are detachably connected with the shafts which carry them, as by screw-shanks $f\,f$, fitting screw-sockets in the ends of the shafts to provide for changing said half-rolls for others to suit different kinds of work, the pressing-surfaces of both pairs of half-rolls or of one of a pair on either side of the frame having different-shaped grooves in them, according to the work to be done. Each kind of work requires a special set of half-rolls. Thus, to make manure or other forks having prongs of oval shape in transverse section, I use two sets of half-rolls—that is, a pair on each side of the frame—having grooves of different shape in each pair, as clearly shown in Fig. 2 of the drawings—that is to say, the pair of half-rolls D D' on the left-hand side of said figure have different-sized angular grooves $g'$ $g^2$ $g^3$ in them, the matching grooves making squares with their angles in a vertical and horizontal position, respectively, and the grooves $g^4$ $g^5$ in the half-rolls D D' on the right-hand side of said Fig. 2 have a pair of matching grooves of oval shape, the major axis of one, $g^4$, of which is horizontal and the other, $g^5$, vertical, in which changed directions each prong of the forks is introduced successively. The angular grooves in the half-rolls on the left-hand side of Fig. 2 are for breaking down or roughing out the prongs before they are introduced to the grooves in the half-rolls on the right-hand side of said figure. The width of the half-rolls is such that when the fork-blank is held horizontally to introduce a prong only one prong of a many-pronged fork can be introduced at a time, the other prongs then lying outside the exterior or interior or both sides of the half-rolls, and the sides of the main frame A have recesses or spaces $h\,h$ in the exterior faces of them to receive certain of the prongs.

To make half-round-prong forks, as also to make diamond-shaped-prong forks, only one side of the machine is used. For half-round prongs the grooves in the half-rolls D D', of which grooves there may be three in number, should be shaped and arranged as shown in Fig. 5—that is, two half-round grooves, $g^6\,g^7$, of different sizes, in the lower half-roll, D', having the chords of their curvature parallel with the axis of said roll, and two quarter-round grooves making one matching half-round groove, $g^8$, having the chord of its curvature in transverse relation with the axis of the two half-rolls and next to the outer sides or faces of said half-rolls, which last-named groove serves to roll the prong of the fork with the face of the fork-blank in a vertical or nearly vertical position, while the other two grooves, $g^6\,g^7$, serve successively to roll the prong when the face of the blank is in a horizontal position. The groove $g^6$ is a roughing-down groove, and the other grooves, $g^7\,g^8$, are what I term "edging-grooves." Fig. 6 of the drawings shows a like construction of grooved half-rolls D D' for performance of the work in like manner, but with the grooves $g^9\,g^{10}\,g^{11}$ shaped to roll triangularly-shaped prongs.

The form of the fork-blank as brought to the machine before rolling the prongs, one at a time, will of course vary with the different kinds of forks to be made. A two-pronged fork, for instance, will be made from a straight bar having only one projection, and that in the center on the one side of it to form the shank, the two prongs being formed from the opposite ends of the bar, which end portions are first rolled and then bent. A three-pronged fork-blank will have a single center-prong projection on the opposite side of the bar to that of the shank; a four-pronged blank, two intermediate-prong projections; a five-pronged blank, like that shown in Fig. 3, will have three intermediate-prong projections, $i'\,i^2\,i^3$, the opposite end portions $k\,k'$ of the bar forming the outer prongs, and the projection $l$ the shank; and a six-pronged fork-blank will have four intermediate-prong projections.

For a two-pronged fork, the opposite end portions of the bar-blank are simply rolled, one after the other, to draw out the metal to form the prongs. A three-pronged fork-blank has the two end portions of the bar passed, one after the other, through the grooves in the half-rolls of the machine, and afterward the center-prong projection similarly rolled, during which latter operation the one end portion of the bar next to the machine, having been lengthened by rolling, will pass within or through the recess $h$ in the side of the main frame made for the purpose. A four-pronged fork-blank is similarly rolled—that is, first and successively the two end portions of the bar, then successively the two intermediate prong-projections, the blank of course being suitably turned to introduce the latter—that is, into a transverse position in relation with the half-rolls. The same action applies to the five and six pronged fork-blanks.

As before observed, the half-rolls D D' are only of such width as to permit of one intermediate prong at a time passing between them when the blank is held horizontally, the remaining prong or prongs standing out of said rolls. Taking, for instance, the five-pronged blank shown in Fig. 3, and supposing it to be held horizontally to roll successively its intermediate prongs, $i'\,i^2\,i^3$, and the prong $i^2$ to be the first one introduced between the half-rolls, then the prong $i'$ will occupy a position outside of the machine, and the prong $i^3$ will be between the rolls and the frame.

To roll the prongs flatwise—that is, with the blank in a horizontal position—there never will be any necessity to bend any of the prongs to clear the half-rolls; but it will be remembered that in some cases the grooves in said rolls occupy different positions relatively to the axes of the rolls, as already described, and shown, for instance, at $g^4\,g^5$, Fig. 2, and $g^6\,g^7\,g^8$ in Fig. 5, to roll the prongs on both their faces and sides, reversing the fork-blank from a horizontal to a vertical or nearly vertical position for the purpose.

When rolling the prongs sidewise—that is, with the fork-blanks in a vertical or nearly vertical position, as shown in Figs. 4 and 5—then, in case of a five or six pronged fork, it will be necessary to bend one or more of the prongs, as shown in Fig. 4. Thus, in the case of a five-pronged fork-blank, I first introduce the prong $i^3$ for sidewise pressure or action in the edging-groove $g^8$, Fig. 5, or it might be the edging-groove $g^{11}$ in Fig. 6. The prongs $i'\,i^2$ will then remain outside of the half-rolls, and lie in vertical relation with the side of one of said rolls; but if after prong $i^3$ has been rolled, after which it occupies a position outside of the rolls, as shown in Fig. 4, prong $i^2$ is introduced between the half-rolls, the same would naturally cause the prong $i'$, which has not yet been rolled, to stand out of the rolls on the reverse side thereof to the edging-groove, and thereby make the fork-blank deviate too much from a vertical position; nor, without crooking it, can the prong $i'$ be inserted within the interior of the lower half-roll, for the reasons that, first, its lying on the inside of the roll would prevent the prong $i^2$ from entering far enough in the groove of the half-rolls; and, secondly, it would hook on the roll when the machine was working. To avoid this, or rather to roll the middle prong, $i^2$, I bend the prong $i'$ as shown in Fig. 4, and thereby insure its possible introduction within the lower roll, so that when the rolls are working it will not hook on any of them, and will secure the proper side rolling of the prong $i^2$—that is, with the blank in a vertical or nearly vertical plane. The bent prong $i'$ is afterward straightened, which may be done, as also the bending of it, by a hook fixed on the machine, and such straightened prong subsequently rolled as required. It is not necessary, however, that it should be perfectly straightened, as it will take its regular straight form in passing through the rolling-machine.

Where it is necessary to introduce a prong as described within the interior of the one half-roll to provide for the side rolling of the prong next adjacent to it, the making of the half-rolls dish-shaped or hollow on their faces is necessary. For four-prong forks the bending of either of the intermediate prongs is not required.

The construction of the rolls in the form of diametrically divided or half ones is absolutely necessary in every case to secure the side rolling of the prongs and to apply the rolling-pressure over the full length of the prongs.

Having thus fully described my invention, I claim as new and desire to secure by Letters Patent—

1. In a machine for rolling fork-prongs, the diametrically-divided rolls D D', made hollow or dished on their sides, substantially as herein shown and described.

2. The combination, with the frame of the machine and shafts which carry and drive the rolls, of one or more pairs of diametrically-divided rolls made hollow or dished on their sides and arranged to occupy an overhanging position on their shafts outside of the frame, essentially as described.

3. The diametrically-divided positively-driven rolls D D', constructed with edging and side flattening rolling-grooves, the walls of one groove projecting at right angles to the walls of the other groove for action on the several sides of the prongs of a fork-blank under changed positions of the blank as fed to the machine, substantially as specified.

4. In a machine for rolling fork-blanks, the frame of the machine constructed with one or more exterior side grooves or recesses, $h$, in combination with one or more pairs of diametrically-divided positively-driven rolls, D D', arranged on the outside of said frame, essentially as and for the purposes herein set forth.

5. The combination of the frame A, having exterior side recesses, $h\ h$, the shafts B C C, the gears $b\ c\ c\ d$, and the diametrically-divided rolls D D' outside of the frame on its opposite sides, essentially as specified.

PHILIPPE DÉNÉRY DUPONT.

Witnesses:
EMILE TARDUEL,
ELISHA MAY.